Nov. 20, 1951  F. T. PASCOE ET AL  2,576,038
CENTRALIZED TRAFFIC CONTROL SYSTEMS FOR THE CODE CONTROL
OF INTERLOCKED SWITCHES AND SIGNALS
Filed Nov. 9, 1946  6 Sheets-Sheet 1

INVENTORS
Frank T. Pascoe and
Arthur L. Jerome.
BY
THEIR ATTORNEY

INVENTORS
Frank T. Pascoe and
Arthur L. Jerome
BY
THEIR ATTORNEY

INVENTORS
Frank T. Pascoe and
Arthur L. Jerome.
BY
THEIR ATTORNEY

Patented Nov. 20, 1951

2,576,038

UNITED STATES PATENT OFFICE 2,576,038

CENTRALIZED TRAFFIC CONTROL SYSTEM FOR THE CODE CONTROL OF INTERLOCKED SWITCHES AND SIGNALS

Frank T. Pascoe, Carnegie, and Arthur L. Jerome, Edgewood, Pa., assignors to Westinghouse Air Brake Company, a corporation of Pennsylvania Application November 9, 1946, Serial No. 708,920

14 Claims. (Cl. 246—3)

1

Our invention relates to centralized traffic control systems for railroads, and more particularly, to railway traffic controlling apparatus for the control of electrically interlocked track switches and railway signals from a control office.

Our invention is particularly adapted for use in connection with a selective communication system of the code type, such, for example, as the remote control system shown in Letters Patent of the United States, No. 2,229,249, issued January 21, 1941, to Lloyd V. Lewis, and in its specific embodiment as disclosed herein, our invention is illustrated as arranged for use in the system of this patent.

In remote control systems of this type, the components are assembled in the form of individual storage units each identified by a selective code call. Each storage unit in the field is adapted to control and indicate a group of traffic governing devices, such as a power operated track switch and the railway signals which govern traffic movements over the switch, and is linked, by means of its code call, with a corresponding storage unit in the office control machine which governs the transmission of control codes for effecting the operation of the switches and signals in accordance with the positions of their control levers. Each control code is initiated by pressing an individual starting button associated with the control levers of the corresponding group, and includes in addition to the code call a group of code elements reflecting the position of each of the levers of the group.

Each office storage unit also includes a group of indication stick relays which respond to indication codes transmitted by the station storage unit having the same code call, to indicate the condition of the switch and signals of the corresponding group and for also indicating the condition of one or more track sections. Furthermore, the system is arranged to transmit the codes one at a time over a single line circuit, without interference, codes originating at the same time, or while the line circuit is in use, being transmitted one at a time in a given order of code superiority.

In the application of the remote control system to the control of traffic on single track railroads, where generally each station includes only one track switch, the preferred mode of operation is to include elements for changing the position of the switch and for clearing a signal which governs train movements over the switch in the same control code. On the other hand, in the application of the system to interlocked track layouts including a plurality of track switches this so-called "composite code" mode of operation has heretofore been unavailable for the reason that a signal may govern train movements over several routes and the switches involved may be

2 controlled by different codes, making it desirable to delay the transmission of the signal clearing code until indications have been received that each switch of the route has assumed the desired position. In such cases an "individual code" mode of operation is generally used, requiring two successive codes, at least, to operate a switch and to clear a signal even though they are governed by the same storage unit.

The principal object of the present invention is to extend the composite code mode of operation to layouts involving a plurality of track switches and signals in order not only to provide a uniform mode of operation when the controlled territory includes both single switch and multiple switch layouts, but also to enable the routes to be set up by the transmission of the minimum number of codes and with a minimum of effort.

In accordance with our invention the control apparatus at the office is so arranged that any route through a track layout involving one or more track switches may be set up by positioning the swtich levers to indicate the route desired, reversing the signal lever for the entering signal, and then pressing the starting button associated with the operated signal lever.

Each starting button when depressed always establishes a circuit for energizing the starting relay for the storage unit with which the starting button is associated, while each starting button when depressed may also establish circuits for energizing the starting relays for one or more additional storage units so that all of the control codes necessary to establish a complete route are initiated by pressing of a single starting button. Each of the circuits governed by a starting button for energizing a starting relay for an additional storage unit is automatically controlled so as to be established only when the starting button is pressed to establish a route which requires transmission of a control code by the additional storage unit to thereby insure transmission of all essential control codes and at the same time prevent transmission of unnecessary control codes.

In case the establishment of the desired route requires the operation of a switch and of a signal controlled by the same storage unit, but does not require the operation of any other switch, the pressing of the appropriate starting button initiates the transmission of a single composite code, as heretofore, but if it requires a change in the position of one or more switches controlled by different storage units, a lockout relay associated with each such unit becomes energized causing the transmission of the proper codes for operating the switches controlled thereby. In addition, each lockout relay which becomes energized delays the transmission of the stored signal clearing code until an indication code is received which indicates that the switch governed by that code lockout relay occupies the position designated by the controlling switch lever.

A feature of our invention is that the operation of only one starting button is required to establish a route, even though the transmission of several different control codes is required in order to set up the route.

A further feature is that each additional code is initiated only when the indicated position of the switch controlled thereby does not correspond with the position of its control lever, thereby avoiding the transmission of idle codes containing control elements for switches which already occupy the required positions.

One object attained by our invention is the provision of improved means for insuring that the code for clearing the signal will be the last of the series of route establishing codes to be transmitted, regardless of the order of superiority of the different codes, and in this respect our invention is an improvement upon that disclosed in an application for Letters Patent of the United States, Serial No. 649,598, filed February 23, 1946, by Arthur L. Jerome, Lloyd V. Lewis and Frank T. Pascoe, for Centralized Traffic Control Systems.

A feature of our invention comprises the control of codes for governing the signals by a system of signal clearing relays controlled jointly by the signal levers and the associated starting buttons, which is an improvement upon that disclosed in an application for Letters Patent of the United States, Serial No. 648,716, filed February 19, 1946, by James I. Grammer, for Centralized Traffic Control Systems. As disclosed herein, these relays respond immediately when the corresponding starting buttons are operated, but they are so controlled over a system of interlocked circuits that each can be picked up to establish a route only when none of the switches of such route are included in a conflicting route having its signal clearing relay energized.

Another feature of our invention is the provision of means for transmitting codes for operating each of the switches individually without operating any signal clearing relay, which means is effective only when all of those signal clearing relays are released which govern routes over the switch even though they are controlled by different storage units.

A further feature of our invention is the provision of means at the switch location for preventing the reception of a switch operating code after the corresponding detector track section is occupied, regardless of the position of the detector track relay, until an indication of the occupancy of the section has been transmitted to the office, together with means at the office governed by this indication for preventing further transmission of codes for operating the switch until an indication is received that the detector section has been vacated.

Other objects, purposes and features of our invention will be pointed out as the description proceeds.

One form of apparatus embodying our invention will now be described, and the novel features thereof will then be pointed out in claims.

Referring to the accompanying drawings.

Similar reference characters refer to similar parts in each of the views.

To simplify the circuits, we have herein shown only the terminals of the sources of current for energizing the various relays, the reference character B designating the positive or supply terminal and the reference character C the negative or common return terminal of the local source of current, in each instance.

To illustrate our invention, we have shown herein an interlocking control system of a conventional type in which all operations for the protection of traffic movements are controlled locally by safety type relays and are governed by communication type relays controlled from a central office by a remote control system which is also of a conventional type.

Figure 1A:
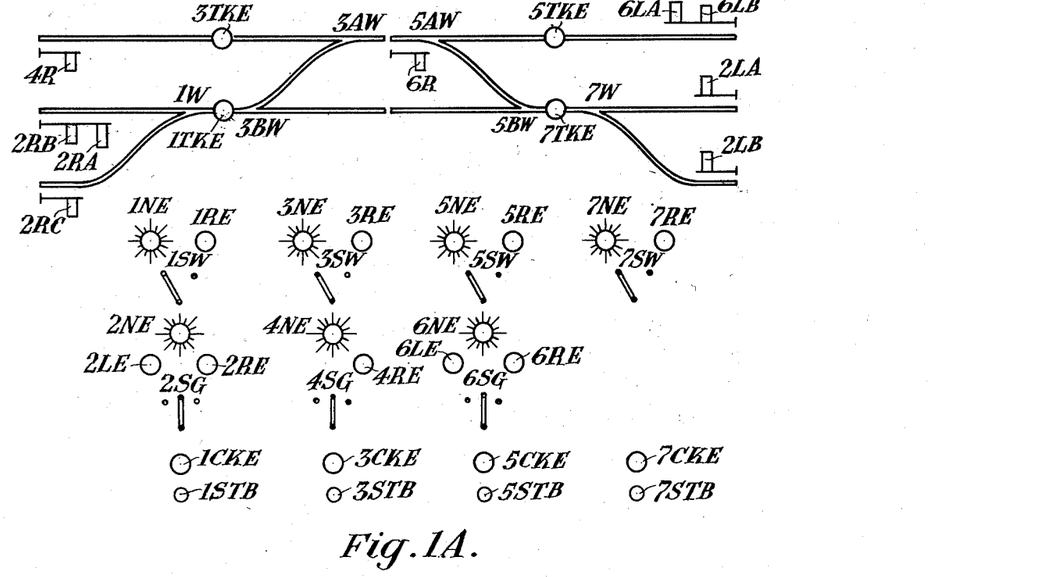
Fig. 1A shows the operator's control panel.
Figures 1B, 1C:
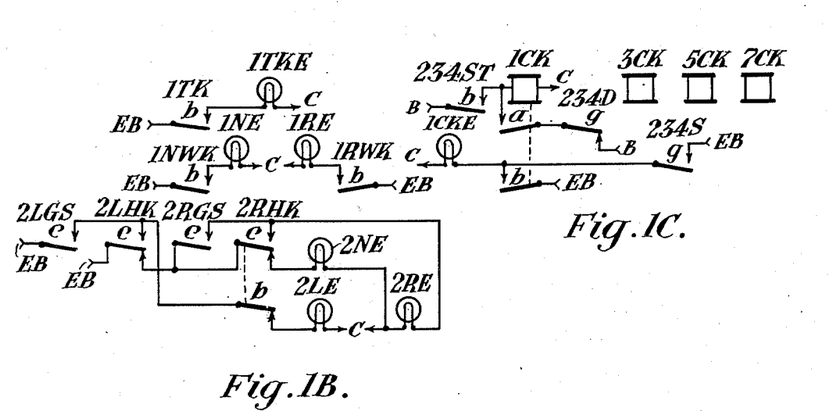
Figs. 1B to 1H, inclusive, show the circuits and apparatus associated therewith at the control office.
Figure 1D:
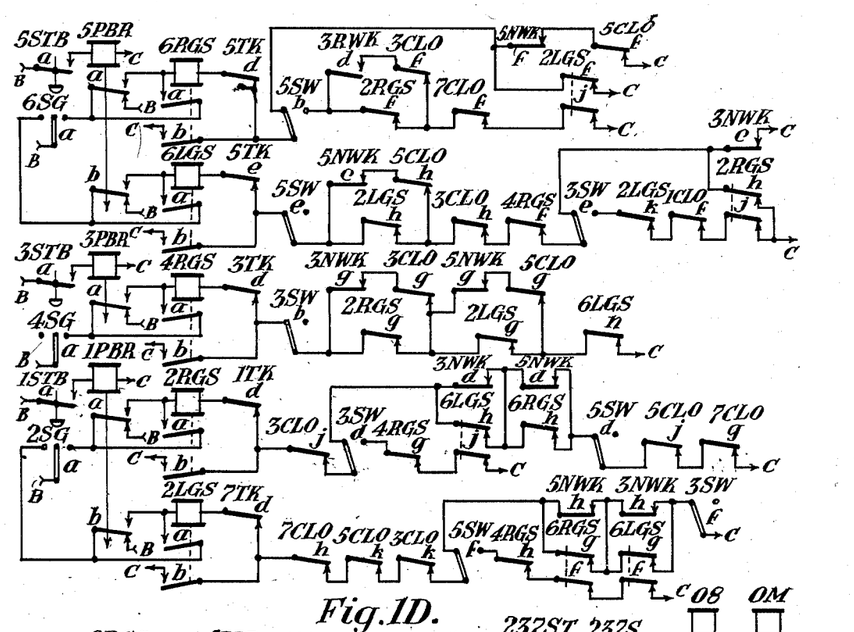
Figures 1E, 1F:
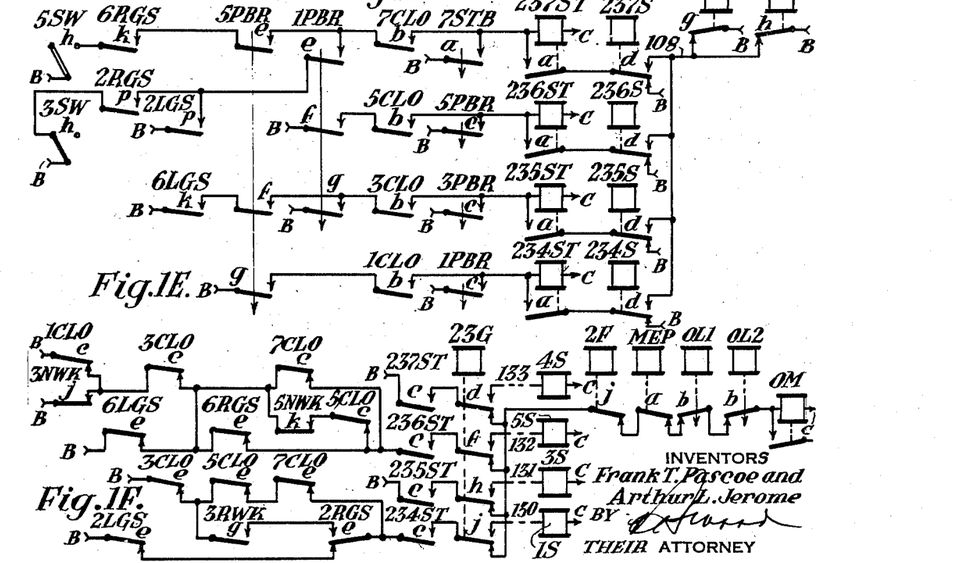
Figure 1G:
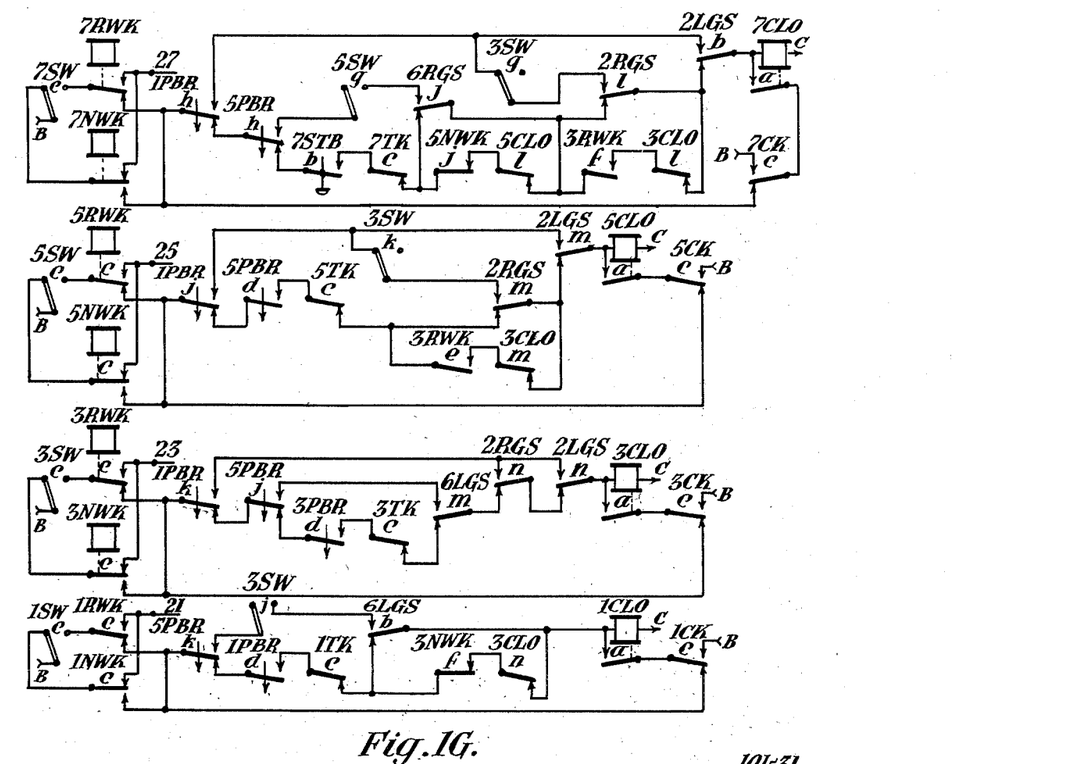
Figure 1H:
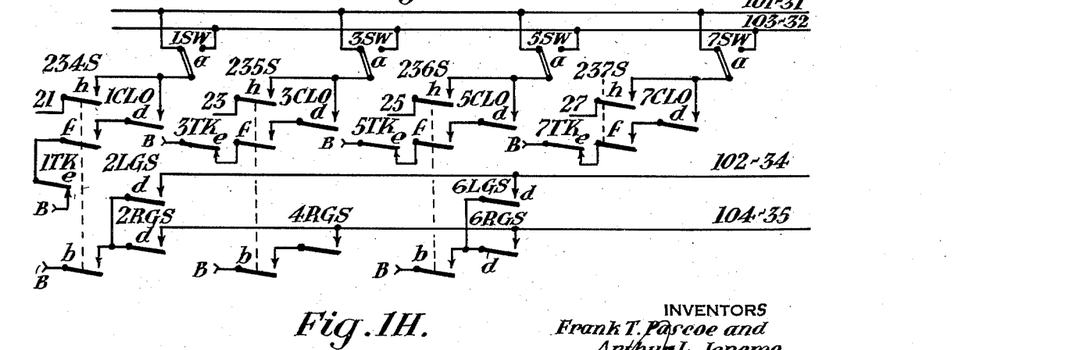

Our invention is embodied principally in apparatus located at the control office and interposed in the remote control system between the operator's levers and code starting buttons, shown in Fig. 1A, and the code initiating and generating portions of the system shown in part in Figs. 1E, 1F and 1H. This interposed apparatus comprises a repeating relay PBR for each starting button and a signal clearing relay or a pair of such relays, RGS and LGS, for each signal lever, shown in Fig. 1D, and a code lock out relay CLO for each switch lever, shown in Fig. 1G. These relays are governed in accordance with wayside conditions by the remote control system indication relays shown in Fig. 3, which also control the indication lamps of Figs. 1A and 1B. Additionally, the remote control system includes a code indicator relay CK, Fig. 1C, in each office storage unit, not shown in the remote control system patent.

When our invention is used the operator is enabled to set up any of the routes and to clear the signal therefor by positioning the switch levers to indicate the course of the route and by reversing the signal lever for the signal which governs train movements over the route in the desired direction, and then initiating code transmission by pressing the starting button associated with that signal lever.

When this starting button is operated, the corresponding relay PBR picks up, closing contacts in Figs. 1D, 1E and 1G. In Fig. 1D, the signal clearing relay RGS or LGS for the signal picks up at once over a route circuit which reflects the position of the switch levers, regardless of whether or not the switches are in the required positions. However, no route circuit is closed if a signal clearing relay for a conflicting route is energized, or if the lock out relay CLO for any switch of the route is energized.

The energized signal clearing relay completes a stick circuit over which it is held energized independently of the route circuits, and operates contacts in Figs. 1D, 1E, 1F, 1G and 1H, those in Fig. 1D serving to open the route circuits for routes which conflict with the one being established. In Fig. 1G, the relay CLO for each switch of the route becomes energized, but only if its switch lever has been moved and is out of correspondence with the indicated position of the switch.

It follows that the energized relays CLO indicate which switches need to be moved to set up the desired route. These relays also operate contacts in Figs. 1D, 1E, 1F, 1G and 1H.

In Fig. 1E, the starting relay ST for the signal clearing code is picked up directly by the operated relay PBR, and contacts closed by the energized relays CLO enable this relay to pick up one or more additional relays ST if the transmission of switch control codes thereby is necessary in order to complete the desired route. Each relay ST picks up the corresponding relay CK in Fig. 1C, which serve to hold the energized relays CLO picked up. Each relay CLO is held energized until an indication code is received which indicates that the position of the associated track switch corresponds to the position of its switch lever.

The contacts of the energized relays CLO in Fig. 1D prevent the energization of any signal clearing relay for a route over a switch which is being operated, and in Fig. 1F, govern the code initiating circuits controlled by the starting relays in such manner as to delay the transmission of the signal clearing code for the route being established until the other control codes involved have been transmitted and indications have been received that the desired route is set up. The energized signal clearing and lock out relays govern the character of the switch and signal control elements in these codes by the operation of contacts in Fig. 1H.

The energized signal clearing relay is released by a track indication relay TK when a train occupies the route, or it may be released by the transmission of a code for putting the signal to stop.

Having thus described the principal features of our invention, we will now describe the system in detail.

*The wayside circuits and apparatus*

Figure 2A:
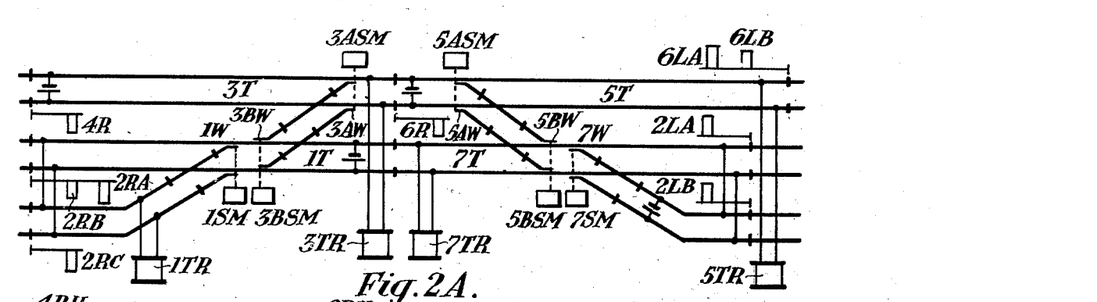
Fig. 2A shows a typical track layout chosen to illustrate our invention.
Figure 2B:
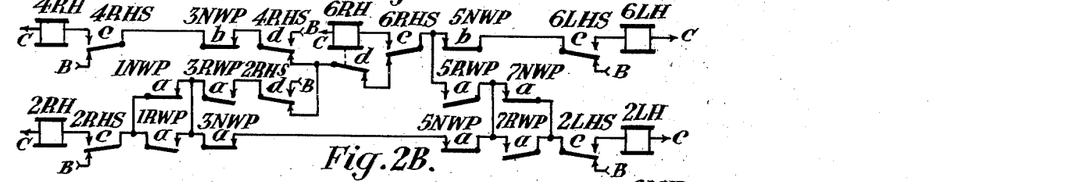
Figs. 2B to 2H and Fig. 2J show the wayside circuits and apparatus.
Figure 2C:
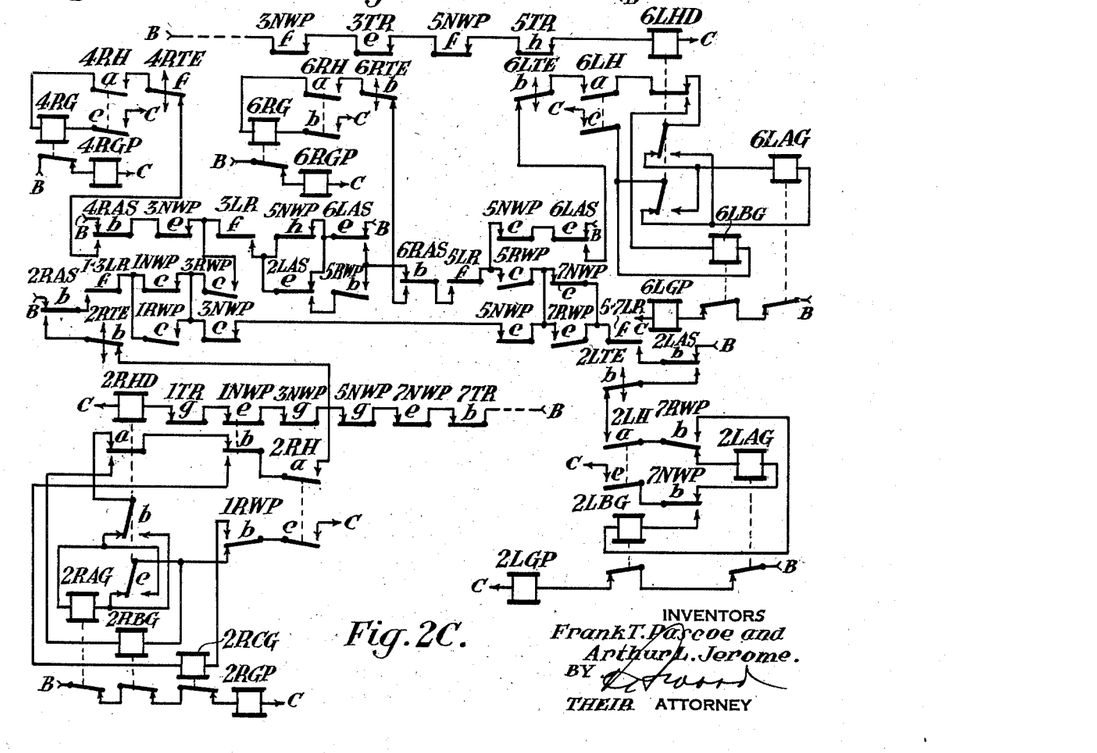

As disclosed herein, the apparatus of our invention is arranged to control the switches and signals of the track layout shown in Fig. 2A, which comprises the two main tracks of a double track railroad connected by the crossover switches 3AW—3BW and 5AW—5BW, the lower track also including two single switches 1W and 7W. Main line train movements over the tracks of the layout are governed by the high speed signals 2RA and 6LA, and other movements by the slow speed signals 2RB, 2RC, 2LA, 2LB, 4R, 6R, and 6LB, located as shown. The tracks are divided into sections by insulated joints to form the detector track sections 1T, 3T, 5T and 7T, each having the usual track circuit provided with a normally energized track relay 1TR, 3TR, etc. The track relays TR govern the line relays 2RHD and 6LHD of Fig. 2C, the signal control relays RHS and LHS of Fig. 2D, the locking circuits of Figs. 2G, 2H and 2J, and also govern the transmission of indications of track conditions to the office in the manner shown in Fig. 3. The track switches are arranged for power operation by the provisions of suitable switch machines 1SM, 3ASM, etc., which are controllable, under proper conditions as reflected by the switch locking relays LR of Fig. 2J, by polarized switch operating relays 1WZ, 3A—WZ, etc., over circuits arranged as shown in Fig. 2E. Each switch is also provided with a suitable overload relay OR, as shown, these circuits being arranged as shown and described in Letters Patent of the United States No. 2,124,601, issued July 26, 1938, to Norman F. Agnew, et al., for Railway Switch Controlling Apparatus.

In Fig. 2E, and likewise in other views involving a plurality of similar sets of circuits only one set of each type is shown in detail. Thus it is to be understood that the circuits for relay 7WZ, for example, controlling switch 7W, are similar to those for relay 1WZ, and that those for the crossover switches 5AW—5BW are similar to those shown for the switches 3AW—3BW.

Figure 2D:
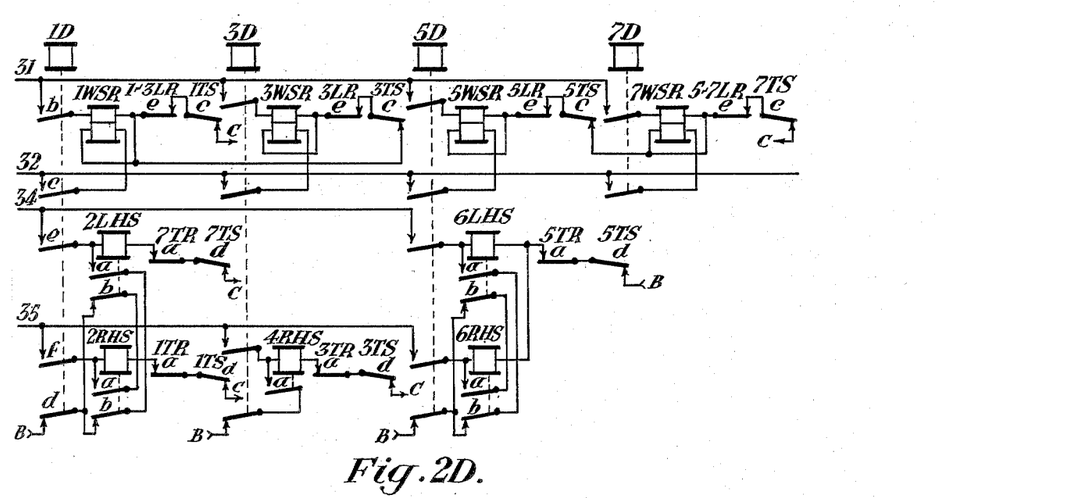
Figure 2E:
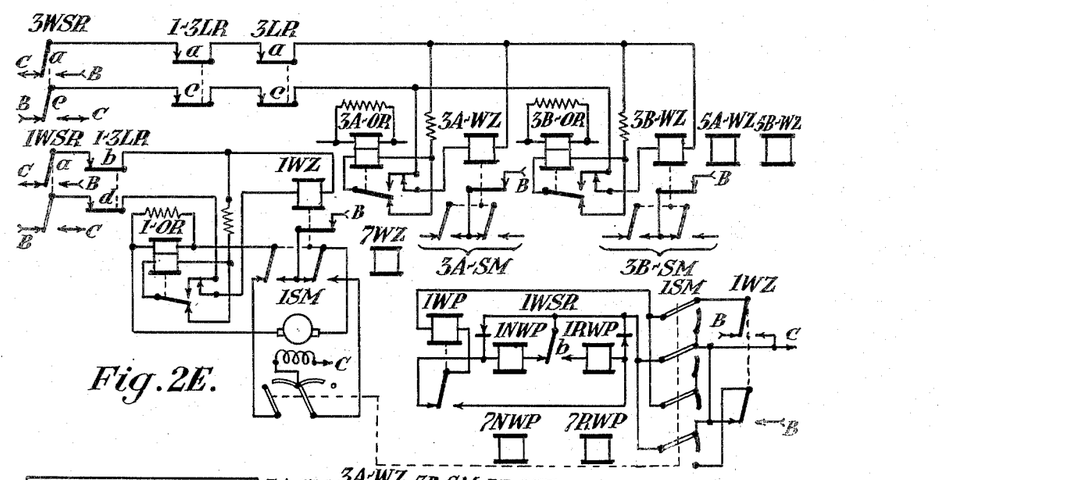

Each switch operating relay WZ in Fig. 2E is controllable under proper locking conditions by a code controlled switch control relay, such as the relay 1WSR, Fig. 2D, which is of the stick polar type. This relay replaces the pair of neutral stick relays NWS and RWS of Fig. 8 of the Lewis patent, the switch control relays WSR being controlled over wires 31 and 32, corresponding to the similarly designated wires in Fig. 7 of the patent, by codes which reflect the positions of the corresponding switch levers, such as lever 1SW of Fig. 1A.

Figure 2F:
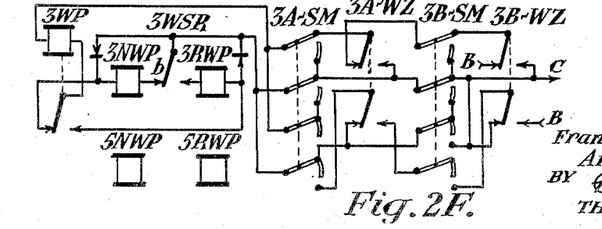

Each switch machine such as 1SM together with the associated switch operating and control relays WSR and WZ, controls a polarized switch indication relay WP, and normal and reverse repeating relays NWP and RWP, shown in Fig. 2F. The circuits of Fig. 2F are arranged as shown and described in Letters Patent of the United States No. 2,351,495, issued June 13, 1944, to Arthur E. Dodd, for Electrical Control Apparatus. Each switch repeating relay such as 1NWP or 1RWP when energized indicates that the associated switch or crossover, as the case may be, is locked in the normal or reverse position, respectively, and also that the associated switch operating and control relays are in the corresponding normal or reverse position. The switch repeating relays NWP and RWP govern the route circuits of Fig. 2B, the signal circuits of Fig. 2C, the locking circuits of Figs. 2G, 2H and 2J, and also govern the transmission of indications of switch position to the office as shown in Fig. 3, for controlling the switch indication relays such as relays 1NWK and 1RWK, which indicates the switch position by the lighting of a lamp 1NE or 1RE located above the switch lever and shown in Figs. 1A and 1B, and also govern circuits shown in Figs. 1D, 1F, and 1G.

It is to be understood that the remote control system is so arranged that an indication code is initiated by a station storage unit whenever a change occurs in the position of one of the wayside relays which govern it or when a control code is received by that unit. Relay 1MSP picks up during the transmission of an indication code and establishes connections to the wires 41, 43, 45, 47 and 44, which govern the character of certain of the code elements. When terminal B is connected to any of these wires, energy is supplied at the office to the corresponding wires 111, 113, 115, 117 and 114, and a delivery relay such as 234D positions the indication relays accordingly.

Referring now to Fig. 2A, it is to be understood that each of the signals there shown is of the well-known searchlight type, having a three-position mechanism shown in Fig. 2C, and identified by the reference character G prefixed by the designation of the signal, and controlled over a circuit network conforming to the track layout. The circuits for the mechanisms G are prepared by the energization of route relays, such as the relays 2RH and 2LH, which relays are controlled over route circuits shown in Fig. 2B, by the signal control relays RHS and LHS of Fig. 2D, and by the switch repeating relays NWP and RWP of Fig. 2F, in such a manner that each route relay RH or LH becomes energized in response to the energization of the corresponding signal control relay only when each track switch of the route governed thereby has assumed a position in agreement with that of its control relay WSR.

As shown in Fig. 2C, the mechanisms 2RAG and 6LAG for the high speed signals 2RA and 6LA are reversibly controlled by polarized line relays 2RHD and 6LHD in a conventional manner to indicate "caution" or "proceed" when energized in a normal or reverse direction, and to indicate "stop" when deenergized. The remaining signals of Fig. 2A govern slow speed movements only, and all their mechanisms are arranged to indicate "caution slow speed" when energized and to indicate "stop" when deenergized.

Each group of signal mechanisms in Fig. 2C controls a stop indication repeating relay RGP or LGP, which as shown is arranged to be energized when all of the signals of its group indicate stop. These relays govern the transmission of signal indications by the code system. Thus as indicated in Fig. 3, the release of relay 2LGP or 2RGP, when one of the corresponding signals is cleared, initiates the transmission of an indication code as explained in the Lewis patent, resulting in the energization of the corresponding signal indication relay 2LHK or 2RHK, which as shown in Fig. 1B completes a circuit for lamp 2LE or 2RE and opens the circuit for lamp 2NE.

Figure 2G:
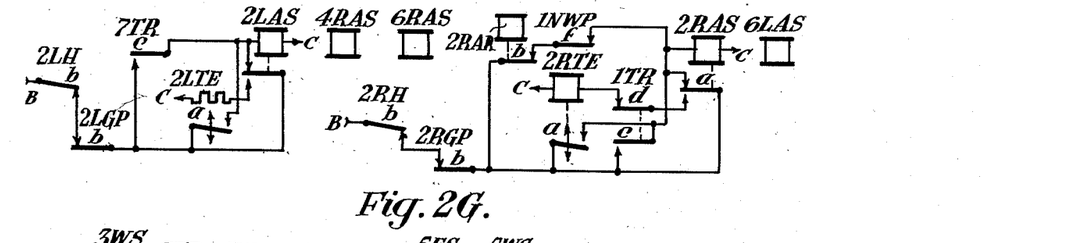
Figure 3:
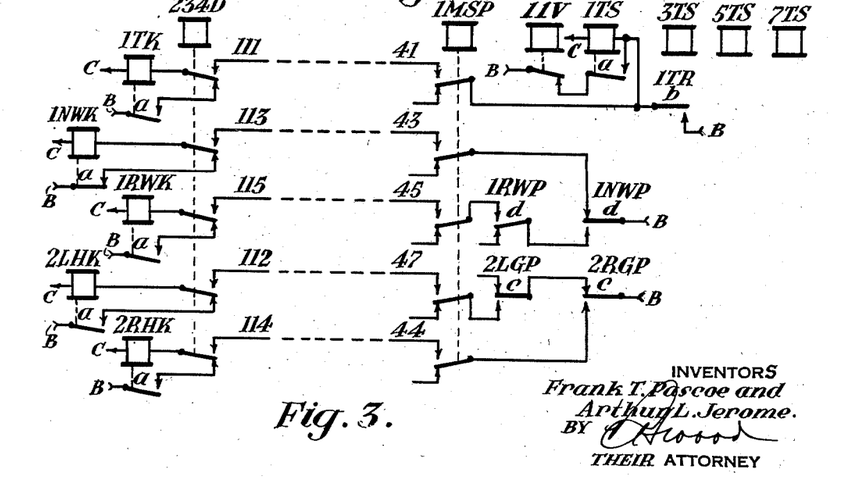
Fig. 3 illustrates the indication system of the Lewis patent hereinbefore referred to in condensed form.

Each signal repeating relay RGP or LGP together with the associated route relay RH or LH controls an approach or time locking stick relay RAS or LAS, shown in Fig. 2G, by which the switches and signals are so interlocked that on the one hand, the release of the approach locking relay for any signal is necessary in order to enable such signal to be cleared, and on the other hand, the approach locking relay must occupy its energized position in order to enable any switch of a route governed by such signal to be operated, or to enable the opposing signal for such route to be cleared. As shown in Fig. 2G, each approach locking relay is normally energized over a stick circuit which includes a front contact b of the stop indication repeating relay RGP or LGP for the associated signal or signals, shown in Fig. 2C, and a back contact b of the corresponding route relay RH or LH of Fig. 2B. When any route relay such as relay 2RH becomes energized to prepare a signal circuit by closing its front contacts a and c in Fig. 2C, the opening of its back contact b releases the associated approach locking relay such as relay 2 RAS, causing the latter relay to close its back contact b in the circuit of Fig. 2C prepared by relay 2RH, for mechanism 2RAG, 2RBG or 2RCB, for that signal which governs traffic movements over the established route.

Figure 2H:
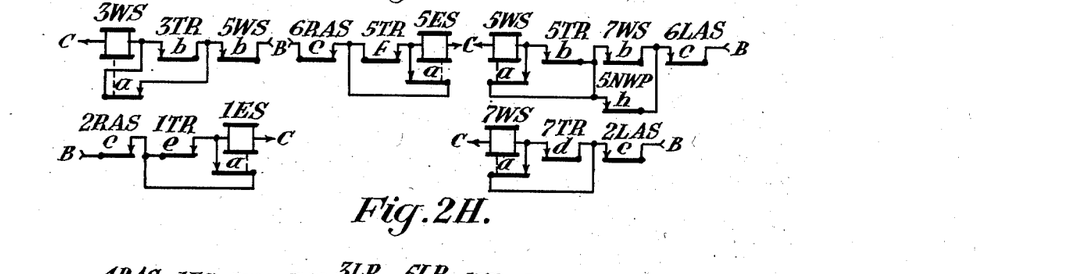
Figure 2J:
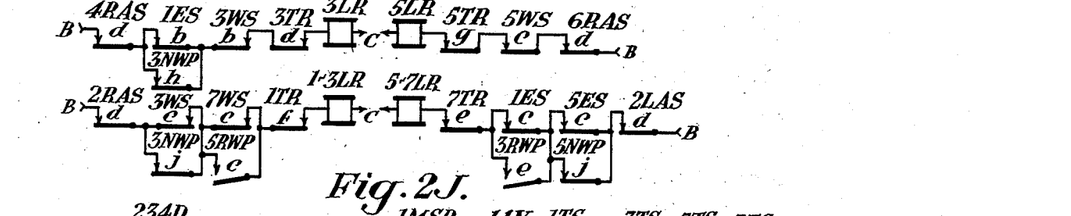

As shown in Fig. 2J, a switch locking relay LR is provided for each switch section controlled by the track relay TR of the same section and each relay LR when released prevents the operation of the associated switch control relay WSR, in Fig. 2D, by opening its front contact e, and also locks the switch or switches in its section by opening its front contacts a and c in the circuits for the corresponding switch operating relay WZ, shown in Fig. 2E.

Each approach locking relay such as relay 2RAS, upon releasing opens its contacts d, Fig. 2J, in the circuit for the switch locking relay for the first section of the route, such as relay 1—3LR, to cause it to release, and also opens a contact c which releases one or more of the section locking relays of Fig. 2H, such as relays IES, to cause the release of the relays LR for the succeeding sections of the route, such as relay 3LR when the crossover switches 3AW and 3BW are reversed, or relay 5—7LR when these switches are normal, thereby holding the relay LR for each section released to lock the switches located therein until a train occupying the route reaches the corresponding section and locks the switches by the release of the track relay TR thereof.

Returning now to Fig. 2C, it will be seen that the clearing of any signal is made dependent not only upon the release of the associated approach locking relay as already explained but also upon the locking of the switches controlled thereby, the signal circuits prepared by the route relay 2RH, for example, including a back contact b of the approach locking relay 2RAS and also including back contacts f of the relay LR for each switch of the route. Furthermore, each signal circuit also includes a front contact b of the approach locking relay LAS or RAS for the opposing signal for the same route, thereby providing time and approach locking protection against the improper reversal of the direction of traffic movements.

Each of the signals, as shown, is arranged to be put to stop automatically when a train enters the first track section of its route, remaining at stop after the first section is vacated, due to the release of the signal control relay RHS or LHS by the corresponding track relay TR, the signal control relay upon releasing causing the corresponding route relay RH or LH to release to open the signal circuit. The signal control relay circuit is also opened at the back contact d of a track storage relay TS shown in Fig. 3, which relay picks up in response to the release of the associated track relay TR. Each relay TS controls the transmission of the indication over wires 41—111 by which the corresponding track indication relay TK at the office is energized to light a lamp TKE on the track diagram to indicate the occupancy of the controlling track section, and is held energized over a back contact of a valve relay 11V, shown in Fig. 7 of the Lewis patent. Relay 11V is controlled in the same manner as relay 1TK, becoming energized when a track occupied code is transmitted and releasing when a track clear code is transmitted. The connection from terminal B at the back contact of relay 11V over contact a of relay 1TS to wire 41 serves to insure the transmission of the track occupied indication even though the section is vacated before the system has an opportunity to transmit the indication, as explained in the Lewis patent. Each track indication relay TK when energized, opens a back contact e, shown in Fig. 1H, which as hereinafter explained, prevents the transmission of code elements for changing the position of the switch in the corresponding track section, and also opens a back contact d, shown in Fig. 1D, which releases the corresponding signal clearing relay RGS or LGS, so that, after a signal has been put automatically to stop, it cannot be cleared again by the transmission of a signal clearing code until an indication is received that the first section of the route has been vacated.

One purpose of this arrangement is to prevent the inadvertent reclearing of a signal which has been put automatically to stop, in the event the transmission of the track occupied indication is delayed until after the controlling track section is vacated.

Referring again to Fig. 2G, it will be seen that when a signal is put automatically to stop by the release of the track relay for the first section of a route, the approach locking relay for that signal, such as relay 2RAS, is picked up in the usual manner over back contact c of the track relay ITR, the open front contacts e and f of which hold relays IES and I—3LR released until the first section of the route is vacated. Each approach locking relay is also provided with the usual means for effecting its energization after a suitable time interval following the manual return of a signal to stop, comprising a time element relay of the thermal type, such as relay 2LTR, for each approach locking relay controlled by low speed signals only, or one of a motor or step by step type providing a longer time element, such as relay 2LTE, for the approach locking relays for high speed signals. In the latter instance, a normally energized approach relay such as relay 2RAR, which may be controlled as in Fig. 9 of the Lewis patent above referred to, provides means for nullifying the delay in the event the signal is put to stop when no train is approaching.

Each relay TR when released holds the associated relay LR released only until the corresponding section is vacated, to provide the usual "sectional release" of the switch locking. In Fig. 2D, it will be noted that a back contact c of the track storage relay TS above referred to is included in the circuit of the switch control relay WSR for each switch in the corresponding section, that is, the circuit of relay IWSR includes back contact c of relay ITS, and that of relay 3WSR includes back contacts c of relays ITS and 3TS. These contacts serve to prevent the reception of the switch control elements of a code while the switch section is occupied, prior to the transmission of an indication of its occupancy to the office. After the track occupied indication is transmitted, the transmission of code elements for changing the position of a switch located in an occupied track section is prevented by the opening of the back contact e of the track indication relay TK, in the circuits of Fig. 1H.

*The circuits and apparatus at the control office*

It is to be understood that the remote control system includes the office coding and storage units of Patent No. 2,229,249 and that these function as described in the patent except for such modifications as are pointed out herein.

As shown in Fig. 1A, the operator's control board includes an illuminated diagram of the track layout and employs four office storage units each having a starting button STB corresponding to the key SK shown in Fig. 5 of the patent. One storage unit associated with the first panel at the left in Fig. 1A is assigned to the control of switch IW and signals 2RA, 2RB, 2RC, 2LA and 2LB, another to the control of the crossover switches 3AW and 3BW, and of signal 4R, the third to the control of switches 5AW and 5BW and of signals 6R, 6LA and 6LB, and the fourth to the control of switch 7W.

Fig. 1B shows the circuits for the indication lamps for the first panel, while Fig. 3 shows the circuits for the indication stick relays of the corresponding office storage unit together with the contacts of the wayside relays by which these are governed in the manner described in the patent. It is to be understood that the indication relay and lamp circuits for the remaining panels and office storage units, not shown, are similarly arranged.

The starting button STB for each panel which contains a signal lever controls a slow release repeating relay PBR, Fig. 1D, the purpose of which is to prolong the effect of a momentary operation of the starting button for a time sufficient to pick up two or three relays successively as the system of our invention requires under certain conditions. Each relay PBR, when energized momentarily, controls circuits in Fig. 1D to enable the signal clearing relays RGS and LGS of the corresponding unit to be picked up or released, depending upon the position of the controlling signal lever SG, and at the same time the operated relay PBR closes a circuit in Fig. 1E to pick up the code starting relay ST for the unit. Each signal clearing relay RGS or LGS may be picked up by the operation of the associated relay PBR only when the route governed by the signal, as designated by the positions of the switch levers SW, does not conflict with any route governed by another signal clearing relay which has been energized.

In case the establishment of a route requires a change in the position of one or more of the track switches, the operated relay PBR completes circuits in Fig. 1G, to pick up a code lockout relay CLO, in each storage unit which governs a switch having its control lever SW out of correspondence with the position of the switch, as reflected by its indication relays NWK and RWK.

In case one or more of the relays CLO become energized, the operated relay PBR completes additional circuits in Fig. 1E, to pick up the starting relays ST for the corresponding units, thereby storing codes for operating the switches as required, in addition to storing a code for clearing the signal for the route. In accordance with this feature of our invention, the proper starting relays are selected automatically so as to store for transmission each of the codes required for the establishment of the desired route in response to a single operation of the starting button STB associated with the operated signal lever SG.

Another result of energizing one or more of the code lockout relays CLO is to open the code initiating and generating circuits, shown in Fig. 1F, controlled by the starting relay for the storage unit which controls the signal, with the result that the code for clearing the signal will be the last of those initiated by the operated relay PBR to be transmitted. In accordance with this feature of our invention, the signal clearing code is delayed or locked out by the energized relays CLO, which relays release to permit the transmission of the signal clearing code only when indication codes are received which indicate that each switch of the route has assumed the position designated by its switch lever SW.

Referring to Fig. 1E, the starting relays 234ST—237ST correspond to those designated 234—237 in Figs. 2 and 5 of Patent 2,229,249 and the circuits in Fig. 1F controlled over contacts c of the relays ST correspond to those controlled over contacts c of relays 234—237 shown in Fig. 2 of the patent except for the addition of the lockout circuits referred to.

It is to be understood that these circuits normally function to govern the selection of corresponding storage units at the office and station as described in the patent, namely, when one or more of the contacts c of the relays ST are closed and connected to terminal B, if the timing relays OL1 and OL2 shown in Fig. 1 of the patent are released, indicating that the code line circuit is free, the master relay OM of the office coding unit becomes energized to initiate the transmission of a control code including selecting elements comprising a code call by which a first selector relay such as relay 2F, a group selector relay such as relay 23G, and a final selector relay such as relay 234S at the office are energized, together with similar relays at the selected station. The four selector relays 234S to 237S for the office storage units are shown in Fig. 2 of the patent and herein in Fig. 1E. The selector relays for the station storage units are similar to the relay S shown in Fig. 7 of the patent and are the relays 1S to 4S shown herein in Fig. 1F.

By reference to Figs. 1 and 2 of the patent, it will be seen that the energization of the selector relay 234S releases relay 23G to prevent the energization of any additional selector relays by the same code, and as shown herein in Fig. 1E, the energization of the selector relay 234S also prepares a circuit by which the associated starting relay 234ST is released by the code system relay O8 when the code call is fully transmitted.

Each office storage unit is provided with a code indicator relay such as the relay 1CK, shown in Fig. 1C, which relay is picked up by the closing of contact b of the associated starting relay ST when that relay becomes energized to store a control code for transmission, and then is held energized until a return indication code is received from the corresponding station storage unit. Each relay CK is released by the operation of the delivery relay D of the associated office storage unit, such as the relay 234D, which relay, as shown in Fig. 5 of the patent and in Fig. 3 of the accompanying drawings, also operates the office indication relays 1NWK, 1RWK, etc., in accordance with wayside conditions.

Each relay CK controls a code indicator lamp CKE, which as shown in Fig. 1A, is mounted above the corresponding starting button. Each lamp CKE becomes lighted when the starting relay of the unit is energized to store a control code for transmission and remains lighted until a return indication is received from the corresponding station.

Each lamp CKE is also lighted over contact g of the associated selector relay such as relay 234S, during the reception of an automatically initiated indication code.

The circuits for generating the switch control elements of a control code, identified by wires 101 and 103 in Fig. 5 of Patent No. 2,229,249, and those for generating the signal control elements, identified by wires 102 and 104, are shown in Fig. 1H of the accompanying drawings, these circuits as shown being modified in accordance with our invention. When terminal B is connected to one or more of the wires 101—104 during the transmission of a control code, terminal B at the receiving station is connected to the corresponding wires 31—35 of Fig. 2D, and a delivery relay such as relay 1D is operated at the end of the code and positions the corresponding group of control relays in accordance with the condition of energization of the wires 31—35 with the same effect as if these were connected directly to the wires 101—104 at the office.

The code elements controlled over wires 101 and 103, by which the switch control relays WSR of Fig. 2D are governed, are controlled jointly by the correspondingly numbered switch levers SW and by the associated code lockout relays CLO of Fig. 1G, as well as by the selector relays S and the track indication relays TK. Additional circuits are provided for energizing wire 101 or 103 which include the wires 21, 23, 25 and 27 and extend to terminal B in Fig. 1G over contacts of the switch levers and indication relays, by which the switch control relay WSR may be energized in a direction corresponding to the position of the track switch indicated by relays NWK and RWK, provided the switch lever SW is also in a corresponding position. It is to be understood, however, that a switch control relay WSR cannot be energized in the opposite direction, to cause it to assume a non-corresponding position, unless the associated lockout relay CLO is energized and the associated track indication relay TK is released.

As shown in Fig. 1G, each relay CLO may be picked up under certain conditions, not only by operation of the relay PBR of another storage unit, as already explained, but also in response to the operation of the starting button STB or its repeating relay PBR for the same storage unit, provided the controlling switch lever SW has been moved and the signal clearing relays controlled by other storage units which govern routes over the switch are released, indicating that the switch is not included in an established route, and also provided the associated track indication relay is released, indicating that the track section containing the switch is not occupied. This permits the switches to be operated individually for test purposes or to free them from obstructions, but without energizing the signal clearing relay for any route. Each relay CLO may also be energized under proper conditions along with a signal clearing relay controlled by the same relay PBR for the purpose of operating a track switch and clearing a signal by a single "composite" code.

The relays CLO also serve to control the route circuits of Fig. 1D so that as soon as a switch operating code is stored for transmission, the energization of a signal clearing relay for any conflicting route is prevented, regardless of the indicated position of the switch.

The code elements controlled over wires 102 and 104, by which the signal control relays LHS and RHS of Fig. 2D are governed, are controlled by contacts d of the signal clearing relays LGS and RGS, instead of by contacts of the signal levers as in the patent. This modification serves to prevent a change in the position of a signal as a result of the operation of any lever other than its control lever, or due to the inadvertent operation of that lever, without operating the associated starting button.

By reference to Fig. 1D, it will be seen that each signal clearing relay RGS or LGS when picked up is held energized following the release of the associated relay PBR over a stick circuit including its own front contacts a and b, and is thereby disconnected from the route circuit over which it was picked up and also from the controlling signal lever SG.

The stick circuit for each signal clearing relay RGS or LGS is arranged to be opened to release the relay by the opening of contact d of a track indication relay TK when an indication is received that a train has entered the first track section of the route governed thereby, and the signal for such route has been restored automatically to stop. The energized signal clearing relay may also be released to put the signal manually to stop by operating the associated button STB when the controlling signal lever SG is in its normal center position.

The condition of the signal clearing relays RGS and LGS is indicated to the operator by including contacts c of these relays in the signal indication lamp circuits of Fig. 1B. When the signals 2R and 2L stand at stop, a red lamp 2NE is lighted above the signal lever 2SG, and when relay 2LGS or 2RGS becomes energized, a green lamp 2LE or 2RE is lighted along with lamp 2NE, lamp 2NE becoming dark when an indication is received which picks up relay 2LHK or 2RHK, to indicate the clearing of the signals controlled by lever 2SG.

Operation

The operation of the system of our invention under different assumed conditions will now be described, starting with the apparatus in the condition shown in the drawing, with all switches normal, all signals at stop, and the detector track sections unoccupied.

It will first be assumed that the operator moves the signal lever 2SG to the right and presses the starting button 1STB associated therewith in order to clear signal 2RA for a train movement over the route already established which includes the lower main track.

In Fig. 1D, relay 1PBR is picked up by the closing of contact $a$ of button 1STB and completes a circuit for relay 2RGS from terminal B at the right-hand contact $a$ of lever 2SG over front contact $a$ of relay 1PBR through relay 2RGS and thence over back contact $d$ of relay 1TK, back contact $j$ of relay 3CLO, contacts $d$ of levers 3SW and 5SW and of relays 3NWK and 5NWK, contact $j$ of relay 5CLO and contact $g$ of relay 7CLO to terminal C. In Fig. 1E, the closing of contact $c$ of relay 1PBR completes a circuit for the starting relay 234ST for the storage unit controlled by the signal lever 2SG. Relays 2RGS and 234ST pick up and complete their respective stick circuits, and in Fig. 1F, relay 234ST completes a circuit from terminal B at back contact $e$ of relay 3CLO over back contacts $e$ of relays 5CLO and 7CLO, front contact $c$ of relay 234ST, back contacts $j$ of relays 23G and 2F, back contact $a$ of relay MEP, back contacts $b$ of relays OL1 and OL2 through relay OM to terminal C, whereupon relay OM picks up to indicate the code transmission in the manner described in the Lewis patent. Relay 234ST picks up relay 1CK, Fig. 1C, and the response of these relays is indicated to the operator by the lighting of lamp 1CKE over contact $b$ of relay 1CK. The red lamp 2NE above lever 2SG is now lighted, and as shown by the circuits of Fig. 1B, the response of relays 2RGS is indicated to the operator by the lighting of the green lamp 2RE, along with lamp 2NE.

If the operator should now inadvertently reverse lever 3SW or 5SW, he would open the pickup circuits for the route relay 6LGS in Fig. 1D, the one which includes the reverse contact $e$ of lever 3SW being open at back contact $j$ of relay 2RGS. He would also open the circuits for relay 6RGS, the one which includes the reverse contact $b$ of lever 5SW being open at contact $f$ of relay 2RGS and also at contact $d$ of relay 3RWK. However, relays 4RGS, 6RGS and 6LGS may be energized over the route circuits which include normal contacts of lever 3SW or 5SW to set up routes which do not conflict with the one governed by relay 2RGS.

If the operator should reverse one or more of the switch levers SW and press the corresponding starting buttons with a view to operating the switches individually, the code lockout relays 3CLO, 5CLO and 7CLO would not respond, and switch control elements effective to move the switches 3W, 5W and 7W would consequently not be included in the resulting codes. The circuit for relay 3CLO, Fig. 1G, controlled over front contact $d$ of relay 3PBR, is now open at back contact $n$ of relay 2RGS while the corresponding circuit for relay 5CLO controlled by contact $d$ of relay 5PBR is open at back contact $m$ of relay 2RGS and also at contact $e$ of relay 3RWK, and that for relay 7CLO, controlled by contact $b$ of button 7STB, is open at back contact 1 of relay 2RGS and also at contact $f$ of relay 3RWK.

It will be seen, therefore, that the operation of the starting button 1STB under the conditions described initiates the transmission of a code for establishing a particular route which cannot be interfered with by the subsequent operation of any of the other starting buttons.

It is to be understood that in response to the code call 234 in the transmitted code relay 234S at the office becomes energized to prepare circuits in Fig. 1H for generating the switch and signal control elements of the code, and at the corresponding station the selector relay 1S operates the delivery relay 1D for controlling the relays 1WSR, 2LHS and 2RHS of Fig. 2D in accordance with the character of these elements. Wire 21 is energized over a circuit extending from terminal B at contact $c$ of lever 1SW, Fig. 1G, over front contact $c$ of relay 1NWK so that in Fig. 1H wire 101 is energized over the circuit extending from wire 21 over contact $h$ of relay 234S and the normal contact $a$ of lever 1SW. At the station wire 31, Fig. 2D, is connected to terminal B in response to the code to cause the energization over contact $b$ of relay 1D of the upper winding of relay 1WSR, which tends to operate relay 1WSR to the normal position which it already occupies. Wire 104, Fig. 1H, is energized by the circuit from terminal B at contact $b$ of relay 234S over contact $d$ of relay 2RGS so that in Fig. 2D relay 2RHS is energized over wire 35 and contact $f$ of relay 1D. After relay 1D releases, relay 2RHS is held energized over a stick circuit including its contact $a$ and back contact $b$ of relay 2LHS and extending to terminal B at back contact $d$ of relay 1D.

In Fig. 2B, relay 2RHS energizes the route relay 2RH over the circuit from terminal B at back contact $c$ of relay 2LHS, over contacts $a$ of relays 7NWP, 5NWP, 3NWP, 1NWP, front contact $c$ of relay 2RHS through relay 2RH to terminal C.

In Fig. 2C contacts $a$ and $e$ of relay 2RH close to prepare a circuit for mechanism 2RAG, and in Fig. 2G the approach locking relay 2RAS is released by the opening of back contact $b$ of relay 2RH.

In Fig. 2H the opening of contact $c$ of relay 2RAS releases the section locking relay 1ES, and in Fig. 2J the opening of contact $d$ of relay 2RAS releases the switch locking relay 1—3LR, and the opening of contact $c$ of relay 1ES releases relay 5—7LR. The relays 1—3LR and 5—7LR then open their front contacts $a$ to $e$ in the circuits for the relays WSR and WZ in Figs. 2D and 2E to lock each of the switches of the route, and since in Fig. 2C back contact $b$ of relay 2RAS is now closed, the closing of back contacts $f$ of the switch locking relays LR completes the circuit for mechanism 2RAG which extends from terminal B at front contact $b$ of relay 2LAS over contact $f$ of relay 5—7LR, contacts $c$ of relays 7NWP, 5NWP, 3NWP and 1NWP, contact $f$ of relay 1—3LR, back contacts $b$ of relays 2RAS and 2RTE and thence over contacts $a$ and $c$ of relay 2RH, contacts $b$ of relays 1NWP and 1RWP and contacts $a$, $b$ and $c$ of the polarized line relay 2RHD through mechanism 2RAG to terminal C. Mechanism 2RAG therefore becomes energized to cause signal 2RA to indicate caution or proceed and to release relay 2RGP, which relay opens its contact b in the circuit for relay 2RAS, and also initiates the transmission of an indication code by which the signal indication relay 2RHK is energized as indicated in Fig. 3, thereby extinguishing the red lamp 2NE, lamp 2RE remaining lighted to indicate the clearing of the signal 2RA.

In the foregoing it has been assumed that all the switches and their control levers were in their normal position when the operator reversed the signal lever 2SG and pressed the starting button 1STB in order to clear signal 2RA. The additional operations required in order to clear this signal when one or more of the track switches and their control levers are initially in their reverse positions will now be described.

Assuming first that lever 1SW stands reversed and also that relay 1RWK is energized and relay 1NWK is released, indicating that switch 1W is reversed. In addition to moving lever 2SG to the right, the operator will restore lever 1SW to normal and then press button 1STB. In this case relays 2RGS, 234ST and 1CK become energized as already described and, in addition, a circuit for relay 1CLO, Fig. 1G, is closed by relay 1PBR, which circuit extends from terminal B at the normal contact c of lever 1SW, back contact c of relay 1NWK, back contact k of relay 5PBR, front contact d of relay 1PBR, contact c of relay 1TK, contact b of relay 6LGS or contact f of relay 3NWK and contact n of relay 3CLO, thence through relay 1CLO to terminal C. Relay 1CLO picks up to complete a stick circuit over its contact a and the front or back contact c of relay 1CK.

The control code initiated by relay 234ST in this case is a "composite" code effective to operate relay 1WSR from reverse to normal and at the same time to energize relay 2RHS, since in Fig. 1H wire 101 is energized over the circuit from terminal B at contact e of relay 1TK, contact f of relay 234S and contact d of relay 1CLO, and wire 104 is energized over contact b of relay 234S and contact d of relay 2RGS. The switch control relays WSR and the indicating relays NWP and RWP are relatively quick acting in comparison with the route relays RH and LH, and although relay 2RHS prepares a circuit for relay 2RH in Fig. 2B, relay 2RH does not pick up because contact a of relay 1NWP is open and relay 1RWP is released to open its contact a by the opening of the righthand contact b of relay 1WSR. It follows that relays 2RAS, 1ES, 1—3LR and 5—7LR remain energized and relay 1WZ is operated to its normal position by relay 1WSR to restore switch 1W to normal.

Referring now to Fig. 1G it will be seen that the stick circuit for relay 1CLO now extends to terminal B at front contact c of relay 1CK. The return indication code which follows the control code finds relays 1NWP and 1RWP released and so releases relay 1RWK, Fig. 3, to extinguish lamp 1RE. Relay 1CK releases to extinguish lamp 1CKE and reestablishes the original stick circuit for relay 1CLO, extending to terminal B at contact c of lever 1SW. This circuit is so arranged that relay 1CLO cannot be released by movement of lever 1SW as long as both of the indication relays 1NWK and 1RWK are released.

As soon as switch 1W completes its movement and is locked in its normal position, relay 1WP is operated to its normal position, energizing relay 1NWP, and then relay 2RH becomes energized to effect the clearing of signal 2RA as in the preceding example, and an indication code is transmitted by which relay 1NWK is energized to light lamp 1NE and to release relay 1CLO, this code also energizing relay 2RHK to extinguish lamp 2NE as in the preceding example.

The operations next to be described are those involved in clearing signal 2RA when lever 3SW and the crossover switches 3AW and 3BW initially stand in their reversed positions. In this case, to clear signal 2RA, the operator restores lever 3SW to normal and then moves lever 2SG to the right and presses button 1STB as in the preceding examples. Contact d of relay 3NWK, in the circuit for relay 2RGS in Fig. 1D previously traced, is now open and relay 2RGS is energized over back contact h of relay 6LGS only if the conflicting route governed by relay 6LGS is not set up.

When relay 2RGS becomes energized, a circuit for relay 3CLO, Fig. 1G, is closed by relay 1PBR from terminal B at the normal contact c of lever 3SW, over back contact c of relay 3NWK, front contact k of relay 1PBR, contact n of relay 2RGS, back contact n of relay 2LGS, through relay 3CLO to terminal C, and relay 3CLO picks up to complete a stick circuit over its contact a and the front or back contact c of relay 3CK. Relays 234ST and 1CK are picked up by relay 1PBR as in the preceding examples, and, in addition, a circuit is closed in Fig. 1E from terminal B at contact g of relay 1PBR over contact b of relay 3CLO to pick up relay 235ST, which in turn picks up relay 3CK so that lamps 1CKE and 3CKE are both lighted. Relay 235ST initiates the transmission of a code for operating the switch control relay 3WSR to normal in which wire 101, Fig. 1H, is energized over contact f of relay 235S and contact d of relay 3CLO, but relay 234ST, although picked up, is prevented from transmitting the signal clearing code because the code initiating and generating circuit in Fig. 1F, which relay 234ST controls, is held open at back contacts e of relays 2RGS and 3CLO.

In Fig. 1D, contact f of relay 2RGS in the route circuit for relay 6RGS is open, consequently the opening of contact f of relay 3CLO in parallel therewith, and the opening of contact d of relay 3RWK by the indication code which follows the control code for operating switches 3AW and 3BW to normal, prevents the energization of relay 6RGS to set up the conflicting route from signal 6R to signal 6LA or 6LB. Likewise, the opening of contact h of relay 3CLO prevents the energization of relay 6LGS, and the opening of contacts g of relays 2RGS and 3CLO prevents the energization of relay 4RGS.

In Fig. 1G, the back contacts l and m of relay 2RGS in the circuits for relays 7CLO and 5CLO are open, and the opening of contacts l and m of relay 3CLO in parallel therewith, followed by the opening of contacts f and e, respectively, of relay 3RWK, prevents the individual operation of the corresponding switches by pressing button 7STB or 5STB. However, if switches 3AW and 3BW fail to assume their normal position promptly, they may be operated individually to reverse or normal as required because relay 3CLO will be held energized irrespective of the position of lever 3SW as long as relays 3NWK and 3RWK remain released, as already explained in connection with lever 1SW.

When switches 3AW and 3BW assume their normal position, relay 3NPW takes up to prepare a route circuit for relay 2RH and to initiate an indication code to energize relay 3NWK, thereby releasing relay 3CLO, which by closing its back contact e, Fig. 1F, completes the code initiating circuit controlled by relay 234ST to initiate the transmission of the signal clearing code.

When lever 5SW or 7SW stands reversed, the operations involved in the clearing of signal 2RA are similar to those described in connection with lever 3SW except that the starting relay for initiating the switch control code is energized by relay 5CLO or 7CLO. When the crossover switches 5A—5B are reversed, contact d of relay 5NWK in the circuit for relay 2RGS is open and relay 2RGS may be energized over back contact h of relay 6RGS only if the conflicting route governed by relay 6RGS is not set up, and when relay 2RGS is energized the opening of its back contact f prevents the energization of relay 6RGS to establish this conflicting route.

It is to be noted that switch 7W is included in routes governed by relays 2RGS, 2LGS and 6RGS, but that relays 2RGS and 6RGS also govern other routes which do not include switch 7W. By reference to Fig. 1G, it will be seen that relay 7CLO may be picked up over contact h of relay 1PBR and contact l of relay 2RGS only when lever 3SW is normal and its contact g is closed, and similarly, relay 7CLO may be picked up by relays 5PBR and 6RGS only when the reverse contact g of lever 5SW is closed. It follows that relay 7CLO responds to the operation of relay 1PBR or 5PBR only when the route being established includes switch 7W. From Fig. 1E it will be seen that the starting relay 237ST is energized by relay 1PBR over the normal contact h of lever 3SW or by relay 5PBR over the reverse contact h of lever 5SW only when the route being established includes switch 7W. When relay 7CLO is energized, its open back contacts f, g and h, in Fig. 1D, prevent the energization of relays 6RGS, 2RGS and 2LGS, respectively, to establish a conflicting route over switch 7W, but the circuits are arranged to permit relay 2RGS to be energized over the reverse contact d of lever 3SW, or relay 6RGS to be energized over the normal contact b of lever 5SW to establish a non-conflicting route. Furthermore, the opening of contact h of lever 3SW or 5SW in Fig. 1E prevents the transmission of a code for operating switch 7W in response to the operation of relay 1PBR or 5PBR except when switch 7W is included in the route being set up.

It has already been pointed out in connection with certain of the routes governed by relay 2RGS that the code initiating and generating circuits of Fig. 1F are held open by the relays CLO so as to lock out or delay the transmission of the signal clearing code until the indicated position of each switch of the route controlled by a different storage unit is in agreement with the position of its control lever. By reference to Fig. 1F it will be seen that the circuits are arranged as required to attain this result in the case of each of the routes. For example, when relay 2RGS is energized with lever 3SW reversed to set up the route from signal 2RB or 2RC to signal 6R, the circuit for initiating the signal clearing code includes contact c of relay 234ST and is completed over front contact e of relay 2RGS following the operation of switches 3AW and 3BW to reverse as indicated by the closing of contact g of relay 3RWK and contact e of relay 3CLO. It will be noted that this circuit is opened by relay 3CLO upon the initiation of a code for operating the switches 3AW and 3BW to normal, prior to the release of relay 3RWK, and that when relay 3RWK releases, back contacts e of relays 5CLO and 7CLO are included in the circuit by which the signal clearing code is initiated. This is for the reason that each of the remaining routes governed by relay 2RGS and all routes governed by relay 2LGS include the switches governed by relays 5CLO and 7CLO in addition to those governed by relay 3CLO.

Furthermore, when relay 6LGS is energized, an initiating circuit for the code for clearing signal 6LA or 6LB is prepared in Fig. 1F which includes contact c of relay 236ST, back contact e of relay 6RGS, back contact c of relay 3CLO and contact j of relay 3NWK or contact c of relay 1CLO. It follows that this code is locked out by the opening of contact c of relay 3CLO if the operation of switches 3AW and 3BW to normal or reverse is required in order to set up the route, and also by contact c of relay 1CLO if these switches have already been reversed so that the designated route includes switch 1W. When relay 6RGS is energized, relay 6LGS is released, and the initiating circuit controlled by relay 236ST in Fig. 1F includes contact c of relay 7CLO or contact c of relay 5CLO and contact k of relay 5NWK, and extends to terminal B at back contact e of relay 6LGS. It follows that the code for clearing signal 6R is locked out by contact c of relay 7CLO and contact k of relay 5NWK when switches 5AW—5BW stand reversed, or by contacts c of relays 5CLO and 7CLO if the operation of these switches to reverse is required to set up the designated route.

It will now be assumed that signal 2RA, 2RB or 2RC has been cleared, but that a train accepts the signal and enters section 1T before an indication of the clearing of the signal is transmitted by the remote control system. In this case the track storage relay 1TS, Fig. 3, will be held energized until an indication of the occupancy of section 1T is transmitted even though the train passes out of this section and reenergizes the track relay 1TR. Relay 2RHS, Fig. 2D, will have been released by the opening of contact a of relay 1TR, releasing relay 2RH to return the signal to stop when the train enters section 1T, but the operator will be unaware of this and it may be that he will retransmit the signal clearing code by reoperating the starting button 1STB. It will be seen that relay 2RHS will not respond to this code even though the train has vacated section 1T, due to the opening of contact d of relay 1TS in its circuit. The next indication code will include elements indicating the occupancy of section 1T and the return of the signal to stop, relay 1TK becoming energized to light lamp 1TKE and to release relay 2RGS, thereby extinguishing lamp 2RE and lighting lamp 2NE, whereupon the operator will return lever 2SG to normal, thereby restoring the apparatus to the condition shown in the drawings.

It may be that the signal clearing code referred to is a composite code for operating switch 1W as well, in which case it may happen that the operator will assume that the switch failed to respond and will have returned the switch lever 1SW to its original position and the signal lever to normal before retransmitting the code as in the preceding example. In this case an impulse for operating the switch control relay 1WSR to normal will be transmitted over the circuit in Figs. 1G and 1H which includes wire 21 but relay 1WSR will remain reversed, due to the opening of contact c of relay 1TS regardless of the condition of the wayside locking circuits provided to prevent the operation of a switch under a train. In other words, if relay 1TR should become energized momentarily due to poor shunting of the track rails by a train in section 1T, so as to pick up relay 1—3LR precisely when a code impulse for operating relay 1WSR is received, the code is rendered ineffective by the opening of contact c of relay 1TS. Relay 1TS is released when a code indicating the occupancy of section 1T is transmitted. This code will energize relay 1TK thereby opening its contact e in the circuits leading to wires 101 and 103 so that a control code for changing the position of the switch 1W cannot be transmitted. This indication code will also energize relay 1RWK, releasing relay 1NWK and relay 1CLO may be released by movement of lever 1SW to reverse to correspond with the indicated position of the switch. It will be evident that this arrangement provides additional protection against the operation of a switch under a moving train over that heretofore available.

It will next be assumed that the operator reverses the switch lever 1SW and presses button 1STB with the signal lever 2SG in its normal center position in order to operate switch 1W individually.

In this case, in response to the energization of relay 1PBR by the starting button 1STB, relay 1CLO is energized over the circuit from terminal B at the reverse contact c of lever 1SW, over back contact c of relay 1RWK, back contact k of relay 5PBR, front contact d of relay 1PBR, contact c of relay 1TK and contact b of relay 6LGS or contact f of relay 3NWK and contact n of relay 3CLO through relay 1CLO to terminal C.

It will be evident that the circuit just traced is unavailable if the route over switch 1W governed by relay 6LGS is set up, in which case relay 6LGS is energized and relay 3NWK is released, and is likewise unavailable if this route is being established by the operation of the crossover switches 3A—3B to reverse, in which case relays 6LGS and 3CLO are energized.

When relay 1CLO picks up, the opening of its back contact f, in Fig. 1D, prevents the energization of relay 6LGS to set up a route over switch 1W, and relay 1CLO is held energized by relay 1CK from the time the switch control code is stored for transmission until a return indication is received, as in the preceding examples.

The operation of each of the remaining switches individually may be carried out in a generally similar manner, as will be obvious from the drawings, and in each case the back contacts of the relays CLO in the circuits of Fig. 1D serve to prevent the energization of any signal clearing relay RGS or LGS to set up a route over the switch controlled from any panel except the one from which the operated switch is governed.

It is to be understood that the chance that an operator would inadvertently move a reversed signal lever to its opposite position or that he would reverse the switch lever of a panel and press the starting button while the signal lever is reversed is considered so remote that it is unnecessary to interlock the two signal clearing relays RGS and LGS controlled by the same lever or to control them by the lockout relay CLO of the same panel, and that the purpose of the interlocked lever circuits as shown herein is primarily to provide protection against improper manipulation when the levers involved are in different panels.

In the foregoing the operations described in detail have been principally those relating to the apparatus governed from the first panel controlled by the starting button 1STB, but since the operation of the apparatus of the other panels functions in a generally similar manner, it is believed that this will be understood, and further, that the operation of the apparatus of our invention as applied to track layouts which differ from the one shown will also be understood without further description.

Although we have herein shown and described only one form of apparatus embodying our invention, it is understood that various changes and modifications may be made therein within the scope of the appended claims without departing from the spirit and scope of our invention.

Having thus described our invention, what we claim is:

1. In combination with a track switch and a signal for governing traffic movements over the switch, switch and signal levers at a remote control office, a switch control relay for operating the switch, a signal control relay for controlling the signal, a code system for transmitting control codes for operating the switch control relay in accordance with the position of the switch lever at said control office and for transmitting other codes for operating the signal control relay in accordance with the position of the signal lever at said office, switch indication means at the office for indicating the position of the track switch, a code lockout relay controlled by said indication means and said switch lever, means for actuating said code lockout relay when the transmission of a code by said code system for clearing said signal is manually initiated provided the position of the switch indicated by said switch indication means does not correspond with the position of the switch lever, means controlled by the code lockout relay when actuated for causing said code system to transmit a code for operating the switch to the position designated by the switch lever and for storing said initiated signal clearing code for transmission following restoration of said code lockout relay to normal, and means for maintaining said code lockout relay actuated from the time said switch control code is initiated until said switch indication means is operated to indicate that the switch has assumed the position designated by said switch lever.

2. In combination with a plurality of track switches and a signal for governing traffic movements over a route including said switches, a switch lever for each switch and a signal lever for said signal at a control office, a code system for transmitting distinctive codes for selectively operating said switches in accordance with the positions of the switch levers at said control office and for transmitting a different code for controlling said signal in accordance with the position of the signal lever at said office, switch indication means at the office for each switch for indicating its position, a code lockout relay at the office for each switch, a starting button associated with said signal lever effective when actuated to initiate the transmission of said code for controlling the signal and for also actuating the code lockout relay for each switch the indicated position of which does not correspond with the position of its switch lever, means controlled by each actuated code lockout relay for causing said code system to transmit a code for operating the corresponding switch to the position designated by its switch lever and for delaying the transmission of the initiated signal control code as long as such code lockout relay remains actuated, and means for maintaining each actuated code lockout relay actuated until the switch indication means for the corresponding switch indicates that such switch has assumed the position designated by its switch lever.

3. In combination with a track layout including a plurality of track switches adapted to be arranged to form different traffic routes with signals for governing traffic movements over the routes, a code system for selectively operating said switches and signals from a control office, signal levers and signal clearing relays controlled thereby for governing the transmission of signal clearing codes by said code system, switch levers and code lockout relays controlled thereby for governing the transmission of switch control codes by said code system, switch indication means at said office for indicating the positions of said switches, a plurality of starting buttons including one for each signal lever for initiating the operation of said code system, means responsive to the operation of any starting button when the associated signal lever is reversed for immediately actuating the signal clearing relay associated therewith provided the switch levers occupy positions designating a route governed by the signal which such signal clearing relay controls, irrespective of the positions of the switches in such route, and also provided no signal clearing relay for a signal governing a conflicting route is actuated, means controlled by the operated starting button and the associated signal clearing relay when actuated for actuating the code lockout relays for only those switches of the designated route the indicated position of which does not correspond to that of their switch levers, means controlled by the operated starting button and the actuated code starting relays for causing said code system to transmit codes for operating each switch having its code lockout relay actuated and for clearing the signal having its signal clearing relay actuated, and means controlled by the actuated code lockout relays for delaying the transmission of said signal clearing code until indications are received that the corresponding track switches in said route have assumed the positions designated by their switch levers.

4. In combination with a railway track switch, indication means at a control office for indicating the position of the switch, a switch lever at the office for controlling the switch, a code system adapted when initiated to transmit a code for operating the switch to a position designated by the switch lever at said office, a code lockout relay at said office, means for causing said code lockout relay to assume an operated position when the transmission of a code by said code system is initiated provided the switch position designated by said switch lever does not agree with that indicated by its indication means, means effective only when said code lockout relay assumes its operated position for rendering the transmitted code effective to operate the track switch from its indicated position to the opposite position, and means controlled by the operation of said indication means following the transmission of said code for restoring said code lockout relay to its normal position provided the position of the switch indicated thereby corresponds with the position of said switch lever.

5. In combination with a railway track layout including a track switch and signals for governing traffic movements over the switch, switch and signal levers and signal clearing relays controlled by said signal levers at a control office, a code system adapted when initiated to transmit codes for clearing any one of said signals when the corresponding signal clearing relay is actuated and for operating said switch to the position designated by said switch lever, indication means at said office for indicating the position of the switch, a code lockout relay, means for causing said code lockout relay to assume an operated position when the transmission of a code by said code system is initiated provided the switch position indicated by said indication means does not correspond with the position designated by said switch lever, means rendering the resulting code effective to operate the track switch only if said code lockout relay assumes said operated position, means responsive to the operation of said indication means following the transmission of said code for restoring said code lockout relay to its normal position provided the switch position indicated by said indication means corresponds to the position designated by said switch lever, and means comprising a system of route circuits which conform to the routes over said track switch and include contacts closed only when said code lockout relay occupies its normal position, for selectively actuating said signal clearing relays only one at a time, said circuits being so arranged that each such relay is selected for actuation by the reversal of the corresponding signal lever and becomes actuated upon the initiation of a code for clearing the signal which such lever controls only if the route governed thereby does not conflict with any route governed by another signal for which the signal clearing relay is actuated.

6. In combination with a railway track layout including a track switch with signals for governing traffic movements over the switch, switch and signal levers at a control office, a code system adapted when initiated to transmit a first distinctive code for clearing a signal designated by the reversal of its signal lever or to transmit a second distinctive code for operating the switch to the position designated by said switch lever, a first and a second starting button for manually initiating the transmission of said first and second distinctive codes, respectively, by said code system indication means at said office for indicating the position of the switch, a code lockout relay, means for causing said code lockout relay to assume an operated position in response to the operation of said first or second starting button when the transmission of said first or second distinctive code is initiated, provided the switch position indicated by said indication means does not correspond with the position designated by said switch lever, means controlled by said code lockout relay and effective if said code lockout relay assumes its operated position upon the initiation of said first distinctive code, when said first starting button is operated, for delaying its transmission and for initiating and causing the prior transmission of said second distinctive code, and means for restoring said code lockout relay to its normal position to enable the transmission of said first distinctive code to be effected when the switch position indicated by said indication means corresponds to the position designated by said switch lever.

7. In combination with a railway track layout including a track switch with signals for governing traffic movements over the switch, a code system for transmitting codes for controlling the track switch and signals in accordance with the positions of switch and signal levers and for also controlling indication means for indicating the position of the switch, a first starting relay effective when operated to close an initiating circuit which when closed causes the system to transmit a code for controlling the track switch, a second starting relay controlling another initiating circuit effective when closed to cause said code system to transmit a code for controlling said signals, a first starting button associated with said switch lever for operating said first starting relay, a second starting button associated with said signal lever for operating said second starting relay, means responsive to the operation of said second starting button when said signal lever is in its signal clearing position but the indicated position of the track switch does not correspond to that of the switch lever for operating both said starting relays, and means controlled by said indication means for delaying the closing of the initiating circuit controlled by the second starting relay until the indicated position of the track switch corresponds to that of said switch lever.

8. In a centralized traffic control system, a detector track section including a track switch, a track relay which is released when said detector section is occupied, a control relay for the switch, a code type communication system connecting the switch location with a control office, means for causing said communication system to transmit switch control codes for operating said control relay in accordance with the position of a switch lever at the office, a storage relay controlled by the track relay, means including said storage relay for causing said communication system to transmit indications of the occupancy of said track section to the office and for storing such indications until transmitted, and means for preventing the response of said control relay to a switch control code transmitted when the track relay is released or when an indication of the occupancy of said detector track section is stored by said storage relay.

9. In a centralized traffic control system, a detector track section including a track switch, a track relay which is released when said detector section is occupied, a control relay for the switch, a code type communication system connecting the switch location with a control office, means for causing said communication system to transmit switch control codes for operating said control relay in accordance with the position of a switch lever at the office, a storage relay controlled by the track relay, means including said storage relay for causing said communication system to transmit indications of the occupancy of said track section to the office and for storing such indications until transmitted, a track indication relay at the office controlled by the indications transmitted by said code system for indicating the occupancy of said track section, means for preventing the response of said control relay to a switch control code transmitted when said track relay is released or when an indication of the occupancy of said detector track section is stored by said storage relay, and means controlled by said track indication relay for preventing the transmission of a code for operating said control relay when said indication relay indicates the occupancy of said detector track section.

10. In a remote control system of the type having an office and a plurality of field stations including a first and a second field station, the equipment at the office including a code transmitter for transmitting different codes to said stations each comprising a first group of elements adapted to select a station and a second group of elements for operating movable devices at the selected station, the equipment at the office including a starting relay for each station, each starting relay being effective when actuated to render effective a circuit governing the code transmitter to cause a code to be sent to the corresponding station and being restored to normal in consequence of transmission of a code to the corresponding station, the equipment at the office normally operating when the starting relays for said first and second field stations are both actuated to transmit a code to said first field station and to thereafter transmit a code to said second field station, the combination with the foregoing apparatus of a track switch governed through said second field station in accordance with the position of a switch lever at said office, a signal controlling traffic over said switch and governed through said first field station in accordance with the position of a signal lever at said office, switch indication means at said office governed in accordance with the position of said track switch, a first starting button associated with said signal lever and a second starting button associated with said switch lever for actuating said first and second starting relays to initiate transmission of codes to the corresponding stations, and means at said office effective only when said first starting button is actuated while said signal lever is in its clear position and said switch lever is out of correspondence with said switch indication means for actuating said second starting relay and for controlling said code transmitter to cause it to transmit the code for said second field station before it transmits the code for said first field station.

11. In a remote control system of the type having an office and a plurality of field stations including a first and a second field station, the equipment at the office including a code transmitter for transmitting different codes to said stations each comprising a first group of elements adapted to select a station and a second group of elements for operating movable devices at the selected station, the equipment at the office including a first starting button effective when actuated to condition said code transmitter to transmit a control code to said first field station and a second starting button effective when actuated to condition said code transmitter to transmit a control code to said second field station, said code transmitter when conditioned to transmit control codes to said first and second field stations normally operating to transmit the control codes to said first field station before operating to transmit the control code to said second field station, the combination with the foregoing apparatus of a track switch governed through said second field station in accordance with the position of a switch lever at said office, a signal controlling traffic over said switch and governed through said first field station in accordance with the position of said track switch, and means at said office effective only when said first starting button is actuated while said signal lever is in its clear position and said switch lever is out of correspondence with said switch indication means for conditioning said code transmitter to transmit a control code to said second field station and to do so before it transmits a control code to said first field station.

12. In a remote control system of the type having an office and a plurality of field stations including a first and a second field station, the equipment at the office including a code transmitter for transmitting different codes to said stations each comprising a first group of elements adapted to select a station and a second group of elements for operating movable devices at the selected station, the equipment at the office including a first starting button effective when actuated to condition said code transmitter to transmit a control code to said first field station and a second starting button effective when actuated to condition said code transmitter to transmit a code to said second field station, said code transmitter when conditioned to transmit control codes to said first and said second field stations normally operating to transmit the control code to said first field station before operating to transmit the control code to said second field station, the combination with the foregoing apparatus of a second control relay governed through said second field station in accordance with the condition of a control circuit at said office, a first control relay governed through said first field station in accordance with the position of a signal lever at said office, a signal governed jointly by said first and second control relays, and means at said office effective only when said signal lever is in its clear position for conditioning said code transmitter to transmit a control code to said second field station and to do so before it transmits a control code to said first field station.

13. In a remote control system of the type having an office and a plurality of field stations including a first and a second field station, the equipment at the office including a code transmitter for transmitting different codes to said stations each comprising a first group of elements adapted to select a station and a second group of elements for operating movable devices at the selected station, the equipment at the office including a starting relay for each station, each starting relay being effective when actuated to render effective a circuit governing the code transmitter to cause a code to be sent to the corresponding station and being restored to normal in consequence of transmission of a code to the corresponding station, the equipment at the office normally operating when the starting relays for said first and second field stations are both actuated to transmit a code to said first field station and to thereafter transmit a code to said second field station, the combination with the foregoing apparatus of a first control relay governed through said first field station in accordance with the position of a signal lever at said office, a second control relay governed through said second field station in accordance with the condition of a control circuit at said office, a railway signal controlled by said first and second control relays and governing movement of traffic over a selected track stretch, a first starting button for actuating said first starting relay to initiate transmission of a code to said first field station, a second starting button for actuating said second starting relay to initiate transmission of a code to said second field station, means at said office effective only when said first starting button is actuated while said signal lever is in its clear position for actuating said second starting relay, and means for rendering said first starting relay incapable of conditioning said code transmitter to transmit a code to said first field station while said second starting relay is actuated and said signal lever is in its clear position.

14. In a remote control system of the type having an office and a plurality of field stations including a first and a second field station, the equipment at the office including a code transmitter for transmitting different codes to said stations each comprising a first group of elements adapted to select a station and a second group of elements for operating movable devices at the selected station, a first starting relay effective when actuated to establish a first operating circuit governing the code transmitter to cause a code to be sent to said first field station, a second starting relay effective when actuated to establish a second operating circuit governing the code transmitter to cause a code to be sent to said second field station, each of said starting relays being restored to normal in consequence of transmission of a code to the corresponding station, the equipment at the office normally operating when the starting relays for said first and second field stations are both actuated to transmit a code to said first field station and to thereafter transmit a code to said second field station, the combination with the foregoing apparatus of a first control relay governed through said first field station in accordance with the condition of a signal lever at said control office, a second control relay governed through said second field station in accordance with the condition of a control circuit at said office, a railway signal controlled by said first and second control relays and governing movement of traffic over a selected stretch of railway track, a first starting button for actuating said first starting relay to initiate transmission of a code to said first field station, a second starting button for actuating said second starting relay to initiate transmission of a code to said second field station, means at said office effective only when said first starting button is actuated while said signal lever is in its clear position for actuating said second starting relay, and means governed jointly by said second starting relay and by said signal lever for preventing establishment of said first operating circuit by said first starting relay while said signal lever is in its clear position and said second starting relay is actuated, whereby operation of said first starting button which results in actuation of said first and second starting relays causes said code transmitter to transmit codes to said first and second field stations in the reverse of the normal sequence.

FRANK T. PASCOE.
ARTHUR L. JEROME.

REFERENCES CITED

The following references are of record in the file of this patent:

UNITED STATES PATENTS

| Number | Name | Date |
| --- | --- | --- |
| 2,141,074 | Young | Dec. 20, 1938 |
| 2,229,249 | Lewis | Jan. 21, 1941 |
| 2,265,240 | Langdon | Dec. 9, 1941 |
| 2,302,038 | Langdon et al. | Nov. 17, 1942 |
| 2,331,262 | Young | Oct. 5, 1943 |
| 2,343,784 | McCann et al. | Mar. 7, 1944 |
| 2,404,303 | Law | July 16, 1946 |
| 2,411,387 | Pascoe et al. | Nov. 19, 1946 |
| 2,420,579 | Young | May 13, 1947 |